(12) United States Patent
Burgess

(10) Patent No.: US 8,123,238 B1
(45) Date of Patent: Feb. 28, 2012

(54) TRANSPORT DEVICE

(76) Inventor: Ricky D. Burgess, Denver, NC (US)

( * ) Notice: Subject to any disclaimer, the term of this patent is extended or adjusted under 35 U.S.C. 154(b) by 279 days.

(21) Appl. No.: 12/564,986

(22) Filed: Sep. 23, 2009

(51) Int. Cl.
  *B62B 1/18* (2006.01)
(52) U.S. Cl. .................. 280/47.27; 280/47.131
(58) Field of Classification Search ........... 280/415.1, 280/495, 504, 652, 656, 659, 47.27, 47.131, 280/769; 414/444
See application file for complete search history.

(56) References Cited

U.S. PATENT DOCUMENTS

| | | | |
|---|---|---|---|
| 4,921,270 A | 5/1990 | Schoberg | |
| 5,244,221 A | 9/1993 | Ward | |
| 5,489,109 A | 2/1996 | Murphy | |
| 5,738,261 A * | 4/1998 | Dula | 224/533 |
| 6,082,755 A | 7/2000 | Topar | |
| 6,152,462 A | 11/2000 | Barrett | |
| 6,286,854 B1 * | 9/2001 | Cross | 280/504 |
| 6,419,244 B2 * | 7/2002 | Meabon | 280/47.27 |
| 2002/0195798 A1 * | 12/2002 | James | 280/656 |
| 2010/0066069 A1 * | 3/2010 | Bradshaw | 280/769 |

* cited by examiner

Primary Examiner — J. Allen Shriver, II
Assistant Examiner — John Walters

(57) ABSTRACT

A transport device that includes a toe plate, a pair of side boards, a mesh backing, and a handle that is capable of being either hand-carried or mounted to a trailer hitch on a lawnmower or other slow moving motor transport. The transport device is fabricated from a steel, tubular frame and also includes at least a pair of intermediate cross braces to provide extra structural support. The handle of the transport device ha a top-mounted shank that juts out at ninety degrees, allowing the shank to be inserted into a trailer hitch of a lawnmower or other type of motorized vehicle. Once inserted into the trailer hitch, a pin, connected by a chain to the handle, can be inserted completely through a hole in the handle to secure the placement of the shank within the trailer hitch.

6 Claims, 4 Drawing Sheets

TRANSPORT DEVICE

BACKGROUND OF THE INVENTION

The present invention concerns that of a new and improved transport device that includes a toe plate, a pair of side boards, a mesh backing, and a handle that is capable of being either hand-carried or mounted to a trailer hitch on a lawnmower or other slow moving motor transport.

DESCRIPTION OF THE PRIOR ART

U.S. Pat. No. 5,489,109, issued to Murphy, discloses a compactly stowable and convertible hand truck-trailer.

U.S. Pat. No. 6,082,755, issued to Topar, discloses an adaptor for use in connection with a hand truck to engage a trailer.

U.S. Pat. No. 4,921,270, issued to Schoberg, discloses a convertible hand truck that includes a pivotable handle member which may be stowed or selectively used as an extension of the toe plate when the hand truck is in an upright two-wheeled position.

U.S. Pat. No. 6,152,462, issued to Barrett, discloses a convertible hand cart for use in storing and transporting equipment.

U.S. Pat. No. 5,244,221, issued to Ward, discloses a multi-use hand truck or dolly apparatus and more particularly, a hand truck useable in the commercial building construction industry.

SUMMARY OF THE INVENTION

The present invention concerns that of a new and improved transport device that includes a toe plate, a pair of side boards, a mesh backing, and a handle that is capable of being either hand-carried or mounted to a trailer hitch on a lawnmower or other slow moving motor transport. The transport device is fabricated from a steel, tubular frame and also includes at least a pair of intermediate cross braces to provide extra structural support. The handle of the transport device ha a top-mounted shank that juts out at ninety degrees, allowing the shank to be inserted into a trailer hitch of a lawnmower or other type of motorized vehicle. Once inserted into the trailer hitch, a pin, connected by a chain to the handle, can be inserted completely through a hole in the handle to secure the placement of the shank within the trailer hitch.

There has thus been outlined, rather broadly, the more important features of a transport device that the detailed description thereof that follows may be better understood and in order that the present contribution to the art may be better appreciated. There are, of course, additional features of the transport device that will be described hereinafter and which will form the subject matter of the claims appended hereto.

In this respect, before explaining at least one embodiment of the transport device in detail, it is to be understood that the transport device is not limited in its application to the details of construction and to the arrangements of the components set forth in the following description or illustrated in the drawings. The transport device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present transport device. It is important, therefore, that the claims be regarded as including such equivalent constructions insofar as they do not depart from the spirit and scope of the present invention.

It is therefore an object of the present invention to provide a transport device which has all of the advantages of the prior art and none of the disadvantages.

It is another object of the present invention to provide a transport device which may be easily and efficiently manufactured and marketed.

It is another object of the present invention to provide a transport device which is of durable and reliable construction.

It is yet another object of the present invention to provide a transport device which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
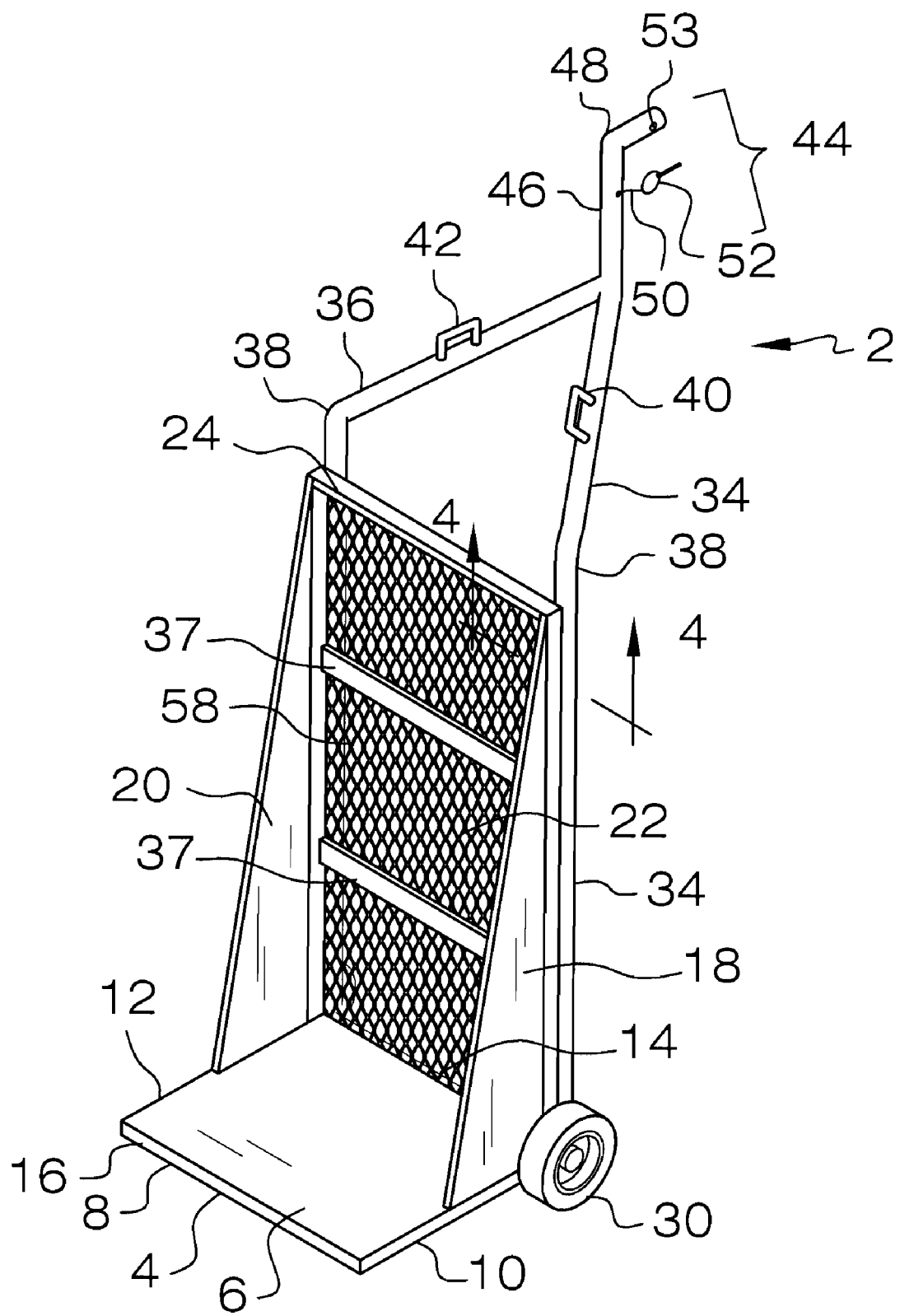
FIG. 1 shows a perspective view of the transport device.
Figure 2:
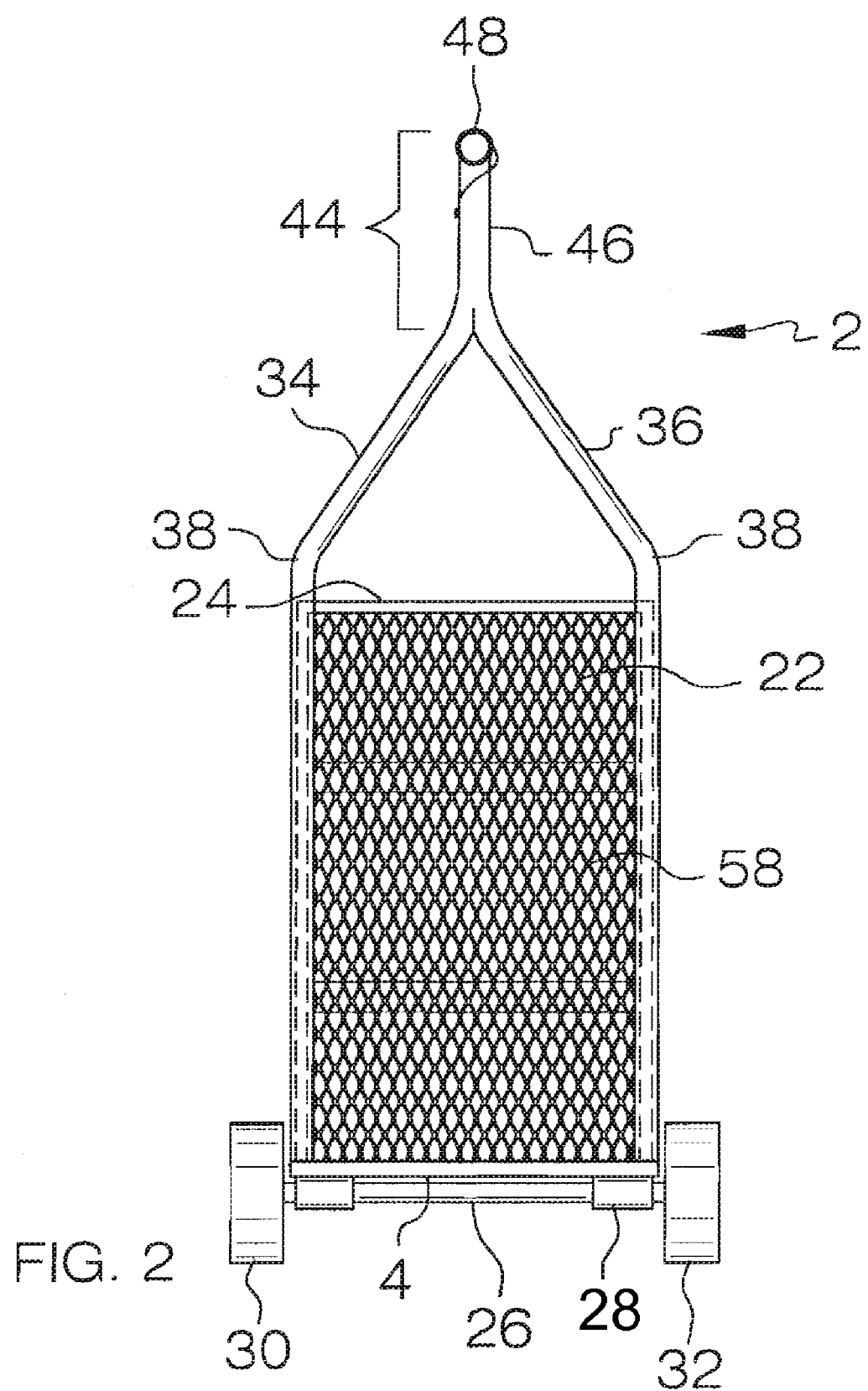
FIG. 2 shows a front view of the transport device.
Figure 3:
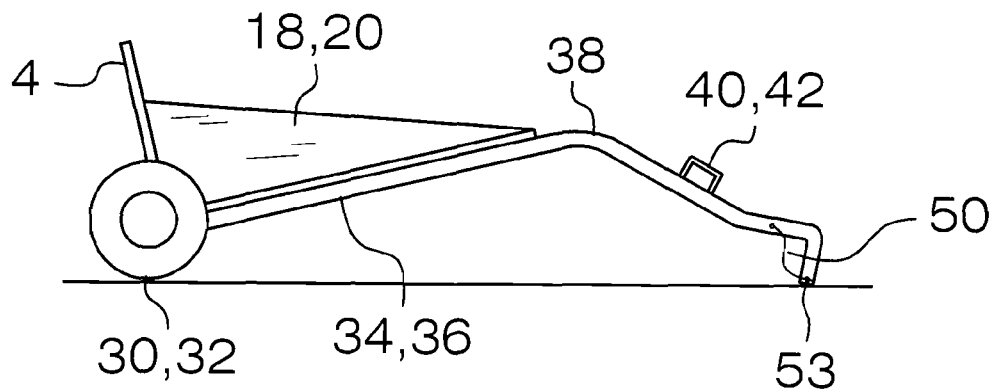
FIG. 3 shows a side view of the transport device as it would be placed on its side, in a down position, on a ground surface.
Figure 4:
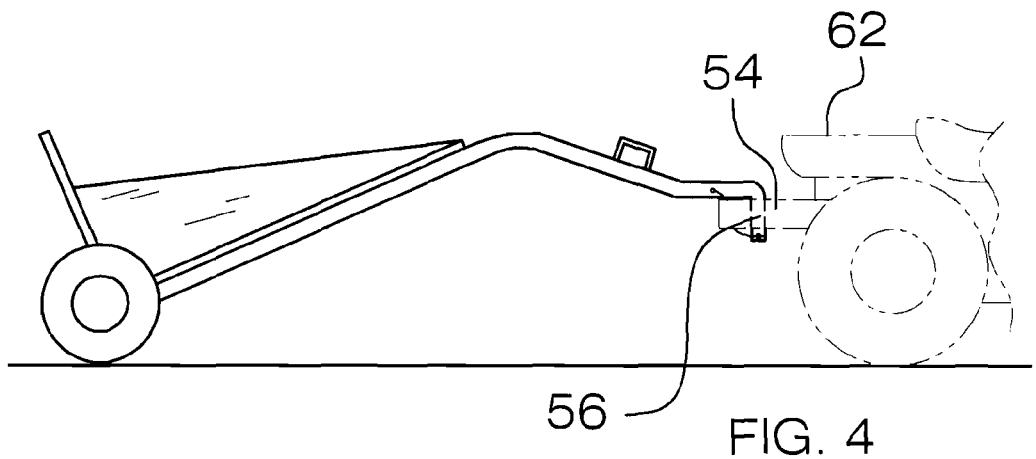
FIG. 4 shows a side view of the transport device as it would be placed almost on its side, in a down position, and inserting the shank attached to the handle to the trailer hitch.
Figure 5:
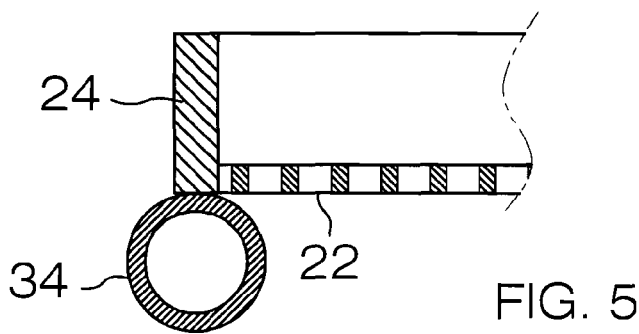
FIG. 5 shows a upward end view of the transport device, highlighting the mesh or sheet metal that is within the transport device.
Figure 6:
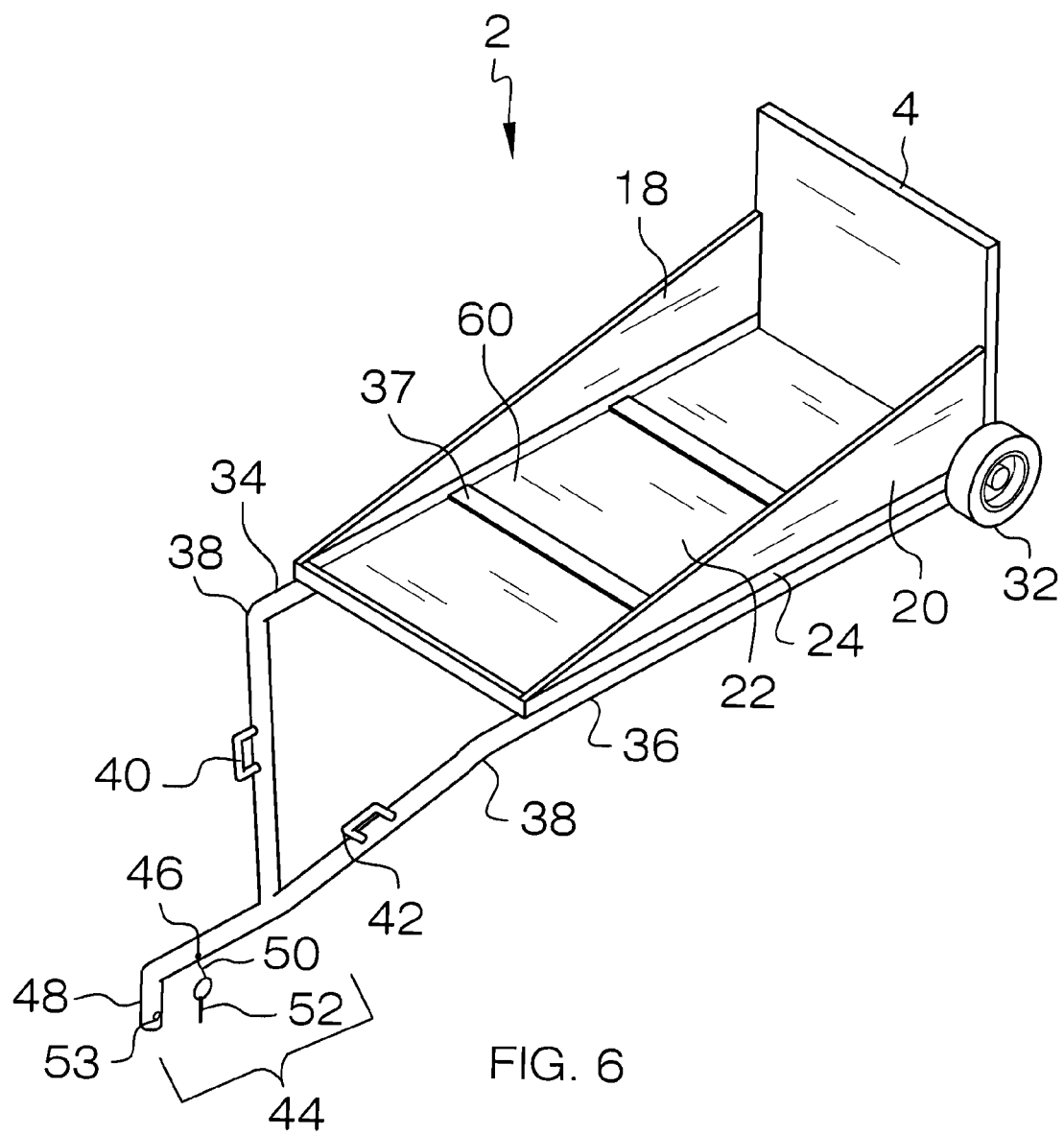
FIG. 6 shows a top perspective downward view of the transport device.

With reference now to the drawings, and in particular to FIGS. 1 through 6 thereof, a new transport device embodying the principles and concepts of the present invention and generally designated by the reference numeral 2 will be described.

As best illustrated in FIGS. 1 through 6, the transport device 2 comprises a toe plate 4 that has two surfaces comprising a top surface 6 and a bottom surface 8. Furthermore, the toe plate 4 comprises two ends comprising a first end 10 and a second end 12, and also, comprises two side surfaces comprising a first side surface 14 and a second side surface 16. The toe plate 4 is preferably rectangular in shape.

A bracket 24 is attached to the first side surface 14 of the toe plate 4 and extends vertically away at a ninety degree angle. The bracket 24 encloses a backing 22, with the backing 22 capable of being a number of possible items designed to serve as a back support for any item placed on the toe plate 4. However, backing 22 preferably comprises either mesh 58 or an amount of sheet metal 60.

Bracket 24 further comprises at least a pair of intermediate cross braces 37. These cross braces 37 are designed to provide additional structural support to the bracket 24 when the transport device 2 is in use.

Transport device 2 further comprises a pair of side boards comprising a first side board 18 and a second side board 20. Each side board has two ends comprising a top end and a bottom end. The first side board 18 is connected to the first end 10 of the toe plate 4 and is also connected to the bracket 24, while the second side board 20 is connected to the second end 12 of the toe plate 10 and is also connected to the bracket 24. Each of the two side boards are essentially triangular in shape, with the bottom end of each side board having the largest width and then whereby the width of the side board essentially lessens as one goes toward the top end of the side board.

The bottom surface 8 of toe plate 4 itself is designed to be mounted on an axle covering 28, which houses axle 26. Axle 26 has two ends comprising a first end and a second end. The first end of axle 26 has first wheel 30, while the second end of axle 26 has second wheel 32 attached to it.

The transport device 2 further comprises a pair of supports comprising a first support 34 and a second support 36. The first support 34 has two ends comprising a top end and a bottom end, with the bottom end of the first support 34 being attached to the top surface 6 of the toe plate 4 near the first side surface 14 of the toe plate 4 and the first end 10 of the toe plate 4. The second support 36 has two ends comprising a top end and a bottom end, with the bottom end of the second support 36 being attached to the top surface 6 of the toe plate 4 near the first side surface 14 of the toe plate 4 and the second end 12 of the toe plate 4.

Each of the supports 34 and 36 have a bend 38 in them above the height of the bracket 24. This bend 38 is about a 30 degree bend and also causes the supports 34 and 36 to bend toward each other. The second end of both the first support 34 and the second support 36 are connected to one another.

First support 34 has a small support handle 40 near the second end of first support 34, with second support 36 having a small support handle 42 near the second end of second support 36. Attached to both the second end of the first support 34 and the second end of the second support 36 is a handle unit 44, with the handle unit 44 comprising a post 46 and a shank 48. The post 46 itself is connected to the second end of each first support 34 and the second end of the second support 36, with the shank 48 bending off from the post 46 at about a 70 to 80 degree angle. The shank 48 is ideally used to attach the transport device 2 to a hitch 54 by inserting the shank 48 through a hitch hole 56 on the hitch 54. Ideally, in this position, the shank 48 would stick out below the bottom of the hitch 54, at which time, a pin 52, attached to the post 46 via a chain 50, would be inserted through a small hole 53 in the hitch 54.

In this position, being attached to the hitch 54, the transport device 2 can be carted around as needed. The hitch 54 itself is obviously connected to a main vehicle 62 such as a vehicle, lawn mower, snow blower, or other such vehicle. Alternatively, the transport device 2 can also be used as a simple dolly, being utilized through human power alone.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A transport device comprising:

a toe plate having two surfaces comprising a top surface and a bottom surface, the toe plate further comprising two ends comprising a first end and a second end, the toe plate first end comprising two side surfaces comprising a first side surface and a second side surface, a bracket assembly attached to the first side surface of the toe plate, the bracket assembly extending vertically away from the toe plate at a ninety degree angle, means for supporting the bracket and providing structural support for the transport device, means for transporting the transport device, a handle unit attached to means for supporting the bracket and providing structural support for the transport device, means for attaching the handle unit to a vehicular hitch, wherein the bracket assembly further comprises a bracket attached to the first side surface of the toe plate, the bracket extending vertically away from the toe plate at a ninety degree angle, a backing enclosed within the bracket, wherein the bracket assembly further comprises at least two intermediate cross braces, the intermediate cross braces designed to provide additional structural support to the bracket, wherein the transport device further comprises a pair of side boards comprising a first side board and a second side board, each of the side boards having two ends comprising a top end and a bottom end, wherein the first side board is connected to the first end of the toe plate, further wherein the first side board is connected to the bracket, further wherein the second side board is connected to the second end of the toe plate, further wherein the second side board is connected to the bracket, further wherein each of the side boards has a triangular shape, further wherein the bottom end of each of the side boards has the largest width, with the width lessening on each side board as one moves toward the top end of each side board, wherein the means for supporting the bracket and providing structural support for the transport device further comprises a pair of supports comprising a first support and a second support, each of the supports having two ends comprising a top end and a bottom end, wherein the bottom end of the first support is attached to the top surface of the toe plate near the first side surface of the toe plate and the first end of the toe plate, further wherein the bottom end of the second support is attached to the top surface of the toe plate near the second side surface of the toe plate and the first end of the toe plate, and a bend located in each support, the bend in each support being located near the second end of each support, and a pair of support handles comprising a first support handle and a second support handle, the first support handle being attached to the first support near the second end of the first support, the second support handle being attached to the second support near the second end of the second support, wherein the second end of the first support and the second end of the second support are attached to one another.

2. A transport device according to claim 1 wherein the means for transporting the transport device further comprises
   (a) an axle covering,
   (b) an axle having two ends comprising a first end and a second end,
   (c) a pair of wheels comprising a first wheel and a second wheel, the first wheel being attached to the first end, the second wheel being attached to the second end,
   (d) wherein the bottom surface of the toe plate is mounted on the axle covering.

3. A transport device according to claim 2 wherein the handle unit further comprises
   (a) a post attached to the second end of the first support and the second end of the second support, and
   (b) a shank attached to the post, the shank bending away from the post at about a 70 to 80 degree angle.

4. A transport device according to claim 3 wherein the means for attaching the handle unit to a vehicular hitch further comprises
   (a) a main vehicle, the main vehicle having a hitch, the hitch having a hitch hole,
   (b) a pin, the pin being attached to the post of the handle unit,
   (c) a hole located in the shank of the handle unit,
   (d) wherein the transport device is bent over to allow the shank to be placed within and through the hitch hole, and
   (e) further wherein the pin is inserted through the hole located in the shank of the unit.

5. A transport device according to claim 4 wherein the backing enclosed within the bracket comprises a mesh backing.

6. A transport device according to claim 4 wherein the backing enclosed within the bracket comprises a sheet metal backing.

* * * * *